United States Patent Office 3,824,299
Patented July 16, 1974

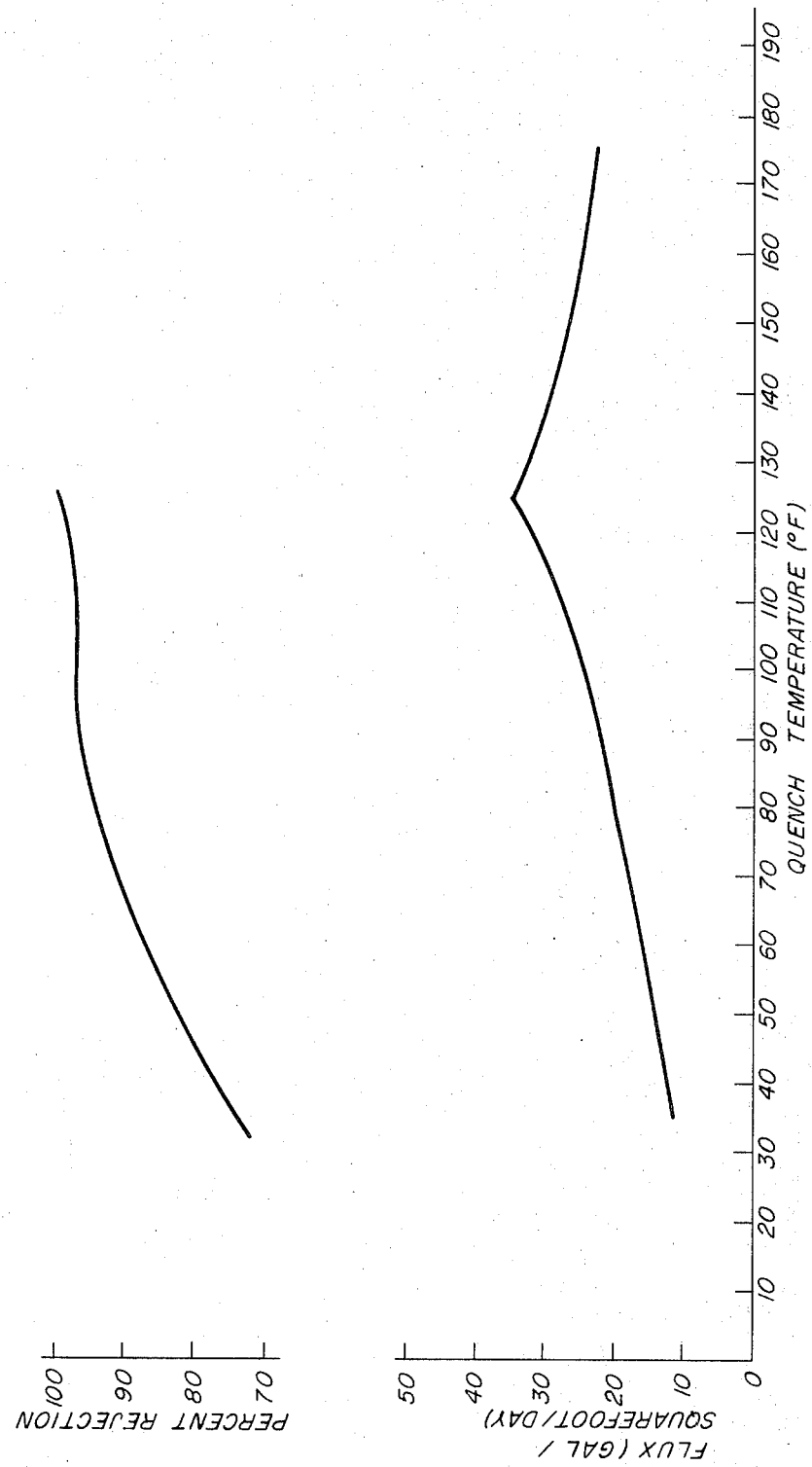

3,824,299
SIMPLIFIED PROCESS FOR MANUFACTURING CELLULOSE ACETATE REVERSE OSMOSIS MEMBRANES
Barry M. Brown and Elbert L. Ray, Rochester, N.Y., assignors to Eastman Kodak Company, Rochester, N.Y.
Filed Jan. 6, 1972, Ser. No. 215,811
The portion of the term of the patent subsequent to Feb. 12, 1991, has been disclaimed
Int. Cl. B29d 27/03
U.S. Cl. 264—41                                     14 Claims

ABSTRACT OF THE DISCLOSURE

Cellulose acetate "reverse osmosis" membranes having excellent "flux" and "rejection" properties can be manufactured via a simplified process if (a) formic acid constitutes the organic fraction of the solvent portion of the formulation from which the membrane is manufactured, and (b) a very hot (>100° F.) initial aqueous quench step is utilized in the manufacturing process.

---

This invention relates to the manufacture of asymmetric cellulose acetate membranes having the ability to preferentially exclude dissolved salts when used in so-called "reverse osmosis" processes. More particularly, this invention relates to simplified processes for manufacturing cellulose acetate membranes having high flux combined with an excellent ability to preferentially exclude dissolved salts when the membranes are used in a "reverse osmosis" process.

It is well-known that certain asymmetric cellulose acetate membranes have a peculiar ability to selectively exclude from passage therethrough dissolved salts when an aqueous solution of such dissolved salts is forced under pressure against the membrane. Such selective exclusion results in purified water passing through the membrane. The processes for purifying water in this way are known as "reverse osmosis" processes, and such membranes are known as "reverse osmosis" membranes.

Cellulose acetate "reverse osmosis" membranes are made by special processes whereby a peculiar "skin" or layer of selectively effective (for preventing the passage of unwanted dissolved salts through the membrane while simultaneously permitting such passage of purified water) porosity is formed at one surface of the membrane. This "skin" is sometimes termed the "active" layer because, without it, the membrane lacks the ability to selectively exclude dissolved salts. The remainder of the membrane consists of a very porous, integral substructure (support for the "active" layer), with increasing porosity occurring as one proceeds in the direction through the membrane away from the "active" layer. The "active" layer is almost invariably only microscopic in thickness, preferably being at most about 10 nanometers thick. It is apparently this special "skin" that endows these reverse osmosis membranes with their valuable selective nature.

Heretofore, it was believed necessary, in order to obtain a useful reverse osmosis membrane, to perform at least the following processing steps:

(1) Cast an appropriate viscous dope in the form of a thin film upon an appropriate casting web (the "dope" or solution generally containing one or more suitable film-forming cellulosic materials and one or more suitable "pore-producing materials" dissolved in a water miscible organic solvent system);

(2) Expose the newly-cast film of dope to air or some other suitable gaseous atmosphere for a period of at least about 15 seconds, to thereby somehow cause an incipient change in the exposed surface of the dope layer so that ultimately the microscopically thin "active" layer can be formed thereon (this step is referred to hereinafter as the "development" step); and (3) Subject the resulting layer to a treatment, usually by immersion, in an aqueous liquid "initial quench" bath to thereby cause the dope layer to "gel" and thus form a membrane having sufficient integral strength to retain its physical shape and structure during subsequent handling and use, including its removal from the casting web.

Sometimes an additional step is utilized in the manufacture of reverse osmosis membranes in order to increase their ability to selectively exclude dissolved salts. Such a step, called a "tempering" step, has usually been performed by treating the membrane in a separate hot water bath (usually at temperatures of from about 160° F. to about 190 F.) after the membrane has been formed in the "initial quench" step.

It has now been discovered that the so-called "development" step (step 2 above) in these overall processes for manufacturing "RO" membranes can be eliminated, provided that the following details are observed:

(a) The organic solvent fraction of the cellulose acetate dope consists essentially of formic acid; and (b) A very high temperature initial quench procedure (in which the temperature of the initial aqueous quench bath is between about 110° F. and about 150° F.) is utilized.

Thus, whereas the overall processes of the present invention require only the following steps:

A. Casting the dope; and
B. Almost immediately thereafter (within at most about 5 seconds after the film is cast), immersing the film into an aqueous quench bath having a temperature of at least about 110° F. (preferably between about 120° F. and about 135° F.) for at least about 5 seconds (followed by an additional, more prolonged cool aqueous wash step if desired), no additional processing is required to produce an excellent RO membrane. Other essential requirements for the successful practice of this invention are (a) that the solvent fraction of the dope consists essentially of formic acid, and (b) that cellulose acetate is at least the major film former in the dope that it utilized.

The cellulose acetate film-forming materials that are useful in the successful practice of this invention include all of those having degrees of substitution of from about 2 to 3, having intrinsic viscosities at 25° C. of at least about 0.5, and which are soluble to the extent of at least about 10 weight percent at 25° C. in a solvent which consists essentially of formic acid. Preferred cellulose acetates are those having intrinsic viscosities of from about 0.8 to about 1.1 and containing about 37 to about 41.5 weight percent acetyl.

"Pore producing materials" useful with cellulose acetate in the manufacture of reverse osmosis (RO) membranes are well-known in the RO membrane manufacturing art and need not be exhaustively treated here, except by way of example to point out that this term includes such materials as magnesium perchlorate, inorganic iodides, bromides, salicylates, chlorates, tetraiodomercurates, thiocyanates, fluosilicates, effective amine salts of strong acids and even triphenyl boron, as well as other materials that are sufficiently soluble (to the extent of at least about 0.02 weight percent at usage temperatures) in the dope compositions. Such "pore-producing materials" function in their well-known capacity to, somehow, contribute to the overall effectiveness of the resulting membranes to function effectively in the "reverse osmosis" process.

Preferred "pore-producing materials" for use in the dope compositions which perform optimally in the present processes are the effective "pore-producing" amine salts of strong acids, as set out in detail in U.S. Pat. 3,522,335 issued to Martin E. Rowley on July 28, 1970 (the disclosure of which is incorporated herein by reference). Preferred pore-producing amine salts include the pore-producing hydrohalide, nitrate, sulfate and phosphate salts of organic amines such as pyridine sulfate, triethylamine sulfate, triethanoloamine sulfate, triethanolamine phosphate, 2-aminoethanol sulfate, N,N-dimethylaniline sulfate and the like. Preferred amine sulfates are those in which the amine:sulfate equivalent ratio is about 2:1 respectively.

Other non-volatile (at 105° C.) materials, such as plasticizers, antioxidants, surfactants, dyes and the like, can also be present in minor amounts dissolved in the cellulosic dopes that are useful in the practice of the present invention. However, it is preferred that such materials constitute at most about 10 weight percent of the total non-volatile fraction of such dopes, whereas the cellulosic film former(s) and pore-producing materials jointly constitute substantially all of the remainder. It is preferred, for example, that the pore-producing material be present at a level of at least about 0.02 and preferably at levels of from about 5 to about 40 weight percent, based upon the total weight of cellulosic film-forming material(s) in the dopes. Similarly, the weight ratio of cellulosic material(s) to total solvent material in these dopes can vary within a wide range, but preferably should be within the range of from about 1:2 to about 1:3 respectively.

The solvent fraction of the useful dopes must apparently consist essentially of formic acid, although small amounts of other volatile (at 105° C.) materials can also be present therein without detracting substantially from the benefits that can be achieved by use of relatively pure formic acid as the solvent. For example, as much as 3 weight percent of water or more (usually introduced along with the formic acid in its commercially available form), as much as 10 weight percent of acetic acid, and/or other water miscible organic solvents such as acetone, methanol, ethanol, dimethyl formamide and the like, as well as very minor amounts of other materials, can be present in the solvent fraction of the dopes useful in the practice of this invention.

The use of the very high temperature initial quench baths that are to be used in accordance with essential step B, above, are described in great detail in United States Patent Application Ser. No. 215,809 filed Jan. 6, 1972 by the present inventors concurrently herewith. The disclosure of this concurrently filed patent application is hereby incorporated by reference into this application. It is apparently essential that the temperature of the initial liquid aqueous quench bath (into which the cast dope layer is placed almost immediately after it is cast) must be at least about 110° F., and should preferably be between about 115° F. and about 140° F. A still further preferred temperature is about 125° F.

The initial aqueous "quench bath" into which the cast films are immediately immersed in accordance with the present processes must contain at least about 50 weight percent (preferably at least about 75 weight percent) of water, and can also contain relatively small amounts of the water miscible and water-soluble components present in the dope compositions. They must have sufficient dissolving power to effectively extract at least half of the solvent(s) and pore-producing material(s) from the gelled membrane when the membrane is permitted to remain immersed in the hot aqueous initial quench bath for 30 seconds or more. The actual period of such immersion will depend upon such factors as the speed at which the particular solvent(s) and other water-soluble materials in the gelled dope composition can be extracted therefrom into the aqueous bath, as well as the extent of such extraction that is desired. Generally, the immersion time in the hot "initial aqueous quench bath" should be at least about 15 seconds (subsequent washing and additional extraction can be undertaken at some later time, if desired), although only about 5 seconds is required to obtain the benefits resulting from use of such a very hot "initial quench bath," and will preferably be from at least about 30 seconds to about 150 seconds or more.

In the practice of the initial casting step of the present processes, generally films of dopes having thicknesses of from about 0.5 to about 10 mils are cast, however, preferable thicknesses include those within the range of from about 3 to about 8 mils.

In the typical practice of the present processes, a casting web of conventional hydrophilic copolymer-subbed poly(ethylene terephthalate) [see U.S. Pat. 3,636,150] is pased gradually and continuously into and through a water bath maintained at the desired very high temperature (for example, 125° F.). A six-mil thick film of dope is introduced onto the casting web via a conventional extruder at a point just before the casting web passes into the very hot quench bath. Thus, only a few (at most, about 5) seconds pass between the time the dope film is cast and the time it is immersed in the very hot water bath. The rate of passage of the web through the initial quench bath can be regulated over a wide range to maintain the immersion for the desired amount of time (a) to "gel" the film to a sufficient extent to develop self-supporting integral strength in the resulting membrane, and (b) to permit the extraction of by far the greater proportion of the formic acid and pore-producing material into the initial quench bath. Then the resulting membrane can be stripped from the casting web and used directly or stored.

A typical membrane made in this manner from a dope containing 23 parts of cellulose acetate (39.8% acetyl and an I.V. of 1.15), 3.5 parts of di-triethylammonium sulfate, 73.17 of formic acid, 0.36 parts of water (all blended together to obtain a clear dope solution prior to the casting step), and cast and then passed into a hot water bath having a temperature of 125° F. and held in the hot bath for 2 minutes prior to its being removed therefrom and stored under water at room temperature until it was tested, yielded the very surprising reverse osmosis data shown below:

Flux=31 gallons per square foot per day
NaCl Rejection=97 percent

"Flux" was the amount of purified water that flowed through the membrane when a solution containing 5000 p.p.m. (0.5%) of sodium chloride is pressed against the "active" side of the membrane under 600 p.s.i. pressure. "NaCl Rejection" is the proportion of NaCl that was retained on the "active" side of the membrane. Note that this excellent reverse osmosis performance was obtained without the need for a separate subsequent "heat tempering" step in the overall manufacturing process.

Reference to the accompanying drawing will result in a better understanding of the present invention. In the drawing, the lower curve illustrates the relationship between "flux" and the temperature of the initial aqueous quench bath for membranes made when formic acid is used as part of the organic solvent system, in substantial portion thereof. The upper curve in the drawing illustrates the relationship between the actual "salt exclusion" or percent salt rejection and the initial aqueous quench bath temperature obtained with a membrane made from a formulation in which a substantial portion of the organic solvent is formic acid. Both curves are also shown and discussed in United States patent application Ser. No. 215,809 referred to herein.

The invention has been described in detail with particular reference to a preferred embodiment thereof, but it will be understood that variations and modifications can be effected within the spirit and scope of the invention.

We claim:
1. A process for manufacturing cellulose acetate reverse osmosis membranes, which process consists essentially of the steps of
(a) casting a concentrated dope in the form a liquid film onto a casting web, and

(b) within at most 5 seconds after step (a), immersing said liquid film into an aqueous quench bath containing at least about 50 weight percent of water and having a temperature above about 110° F. for at least about 5 seconds and long enough to cause the dope to set; said concentrated dope containing at least about 10 weight percent of a cellulose acetate film former and at least about 0.02 weight percent of a pore producing material dissolved in a solvent fraction which consists essentially of formic acid.

2. A process as in claim 1, wherein the membrane is held in said aqueous quench bath for a sufficient period of time for at least about half of the water-soluble and water miscible portions of said dope to be extracted from said membrane.

3. A process as in claim 1, wherein said temperature is between about 115° F. and about 140° F.

4. A process as in claim 3, wherein said membrane is held in said aqueous quench bath for at least about 15 seconds.

5. A process as in claim 1, wherein said aqueous quench bath consists essentially of water.

6. A process as in claim 3, wherein the pore-producing material is selected from the group consisting of pore-producing hydrohalide, nitrate, sulfate and phosphate salts of organic amines.

7. A process as in claim 6, wherein the weight ratio of solids to solvent in said concentrated dope is between about 2:1 and about 3.5:1, respectively.

8. A process as in claim 7, wherein the pore-producing material is selected from the group consisting of pyridine sulfate, triethylamine sulfate, triethanolamine sulfate, 2-aminoethanol sulfate, N,N-dimethylaniline sulfate, picoline sulfate and lutidine sulfate; the ratio of amine to sulfate being about 2:1, respectively.

9. A process as in claim 8, wherein said cellulose acetate contains from about 37 to about 41.5 percent acetyl and has an intrinsic viscosity (at 25° C. in acetone) of at least about 0.5.

10. A process as in claim 8, wherein the amount of said pore-producing material in said dope is between about 5 and about 40 weight percent of the cellulose acetate in said dope.

11. A process as in claim 10, wherein said pore-producing material is di-triethylammonium sulfate.

12. A process as in claim 10, wherein said pore-producing material is di-pyridine sulfate.

13. A process as in claim 10, wherein said pore-producing material is di-triethanolammonium sulfate.

14. A process for manufacturing a cellulose acetate reverse osmosis membrane, which process consists essentially of the steps of (a) casting a concentrated dope in the form of a liquid film from about 2 to about 8 mils thick onto a casting web, and (b) within at most about 3 seconds after step (a), immersing said liquid film into a hot aqueous quench bath having a temperature above about 115° F. for at least about 5 seconds and long enough to cause the dope to set;

said concentrated dope consisting essentially of a solution of cellulose acetate and ditriethylammonium sulfate in formic acid and said hot aqueous quench bath consisting essentially of liquid water.

References Cited

UNITED STATES PATENTS

| | | | |
|---|---|---|---|
| 3,283,042 | 11/1966 | Loeb et al. | 264—49 |
| 3,666,508 | 5/1972 | Justice et al. | 106—169 |
| 3,673,084 | 6/1972 | King et al. | 106—178 |
| 3,721,596 | 3/1973 | Drake | 161—98 |

MAURICE J. WELSH, Primary Examiner

U.S. Cl. X.R.

264—49